United States Patent
Hofrichter et al.

(10) Patent No.: US 8,589,816 B2
(45) Date of Patent: Nov. 19, 2013

(54) CE DEVICE FOR HOME ENERGY MANAGEMENT

(75) Inventors: Klaus Hofrichter, San Diego, CA (US); Nick Colsey, Del Mar, CA (US)

(73) Assignee: Sony Corporation, Tokyo (JP)

( * ) Notice: Subject to any disclaimer, the term of this patent is extended or adjusted under 35 U.S.C. 154(b) by 107 days.

(21) Appl. No.: 13/074,496

(22) Filed: Mar. 29, 2011

(65) Prior Publication Data

US 2012/0117503 A1 May 10, 2012

Related U.S. Application Data

(60) Provisional application No. 61/411,212, filed on Nov. 8, 2010.

(51) Int. Cl.
*G06F 3/048* (2013.01)

(52) U.S. Cl.
USPC .......................................................... 715/772

(58) Field of Classification Search
USPC ........................... 715/772; 700/295, 296, 291
See application file for complete search history.

(56) References Cited

U.S. PATENT DOCUMENTS

| | | | | |
|---|---|---|---|---|
| 4,206,872 A | * | 6/1980 | Levine | 236/46 R |
| 4,350,980 A | * | 9/1982 | Ward | 340/870.02 |
| 4,401,943 A | * | 8/1983 | Morris | 324/157 |
| 4,644,320 A | * | 2/1987 | Carr et al. | 340/12.37 |
| 8,195,340 B1 | * | 6/2012 | Haney et al. | 700/295 |
| 2002/0047774 A1 | * | 4/2002 | Christensen et al. | 340/3.54 |
| 2003/0135338 A1 | * | 7/2003 | Knaus et al. | 702/61 |
| 2004/0259435 A1 | * | 12/2004 | Stephan et al. | 439/894 |
| 2007/0213879 A1 | * | 9/2007 | Iwamura | 700/292 |
| 2008/0101456 A1 | * | 5/2008 | Ridge et al. | 375/240.01 |
| 2008/0306985 A1 | * | 12/2008 | Murray et al. | 707/102 |
| 2009/0003309 A1 | * | 1/2009 | Bawcutt et al. | 370/351 |
| 2009/0195349 A1 | * | 8/2009 | Frader-Thompson et al. | 340/3.1 |
| 2009/0240380 A1 | * | 9/2009 | Shah et al. | 700/295 |
| 2009/0319905 A1 | * | 12/2009 | Loeb et al. | 715/736 |
| 2011/0055745 A1 | * | 3/2011 | Penney et al. | 715/771 |

* cited by examiner

*Primary Examiner* — Phenuel Salomon
(74) *Attorney, Agent, or Firm* — John L. Rogitz

(57) ABSTRACT

A CE device employs user interfaces to allow a user to define energy management rules within the user's premises, visualize energy use in the home and in neighbor's homes for comparison and competition in saving energy, and receive tailored advertisements for appliances that are more energy efficient than what the user currently owns.

16 Claims, 3 Drawing Sheets

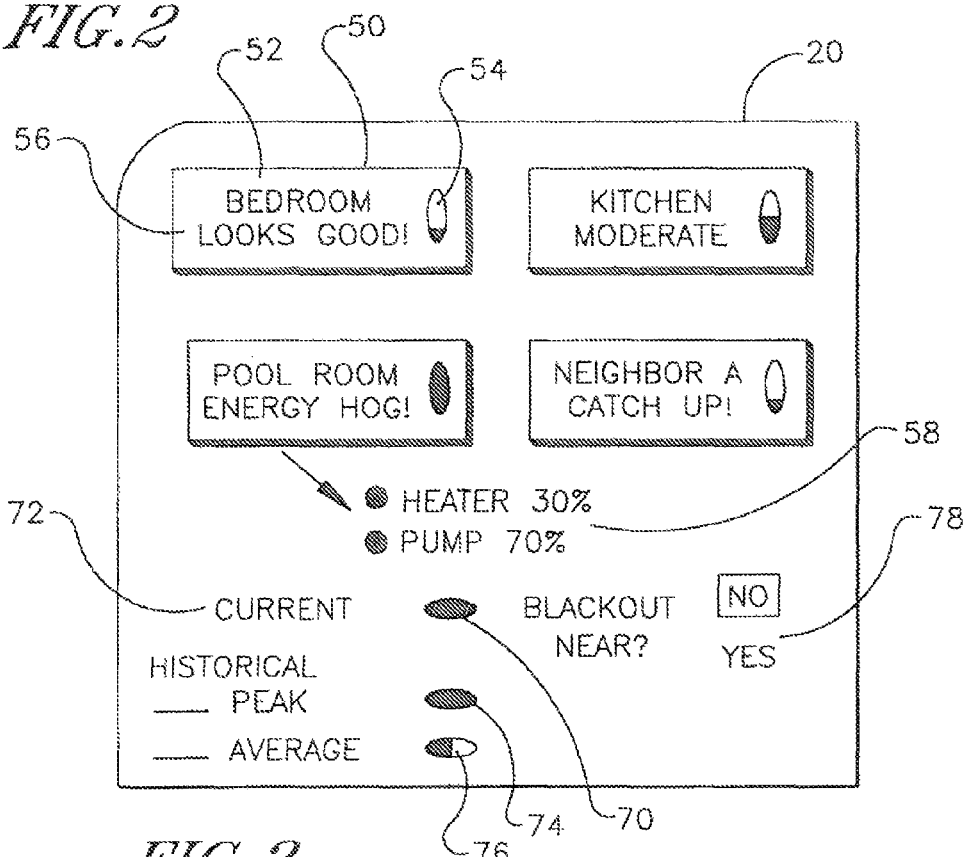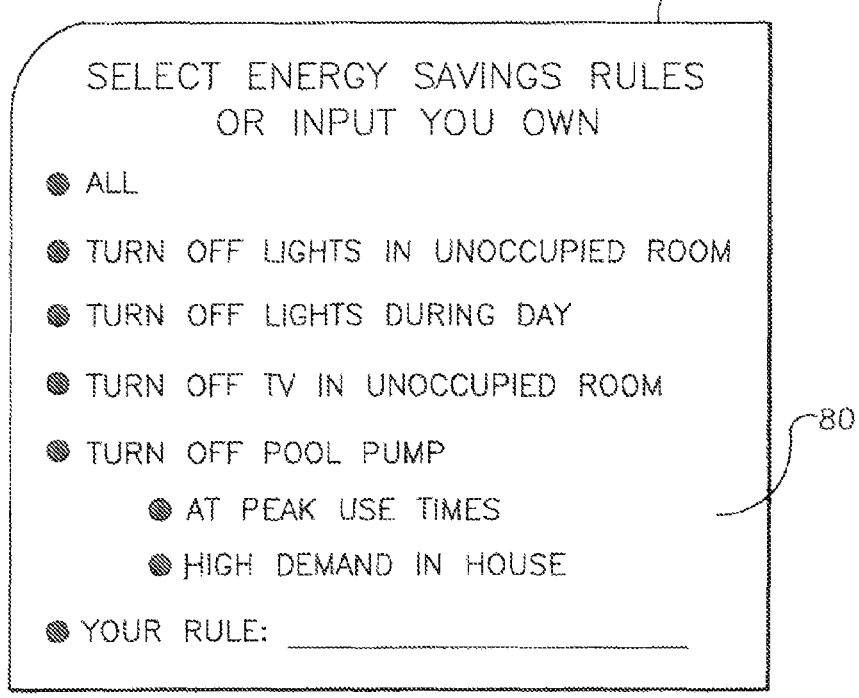

CE DEVICE FOR HOME ENERGY MANAGEMENT

This application claims priority to U.S. provisional application Ser. No. 61/411,212, filed Nov. 8, 2010.

I. FIELD OF THE INVENTION

The present application relates generally to consumer electronics (CE) devices such as digital clocks, TVs, and the like with home energy management features.

II. BACKGROUND OF THE INVENTION

Home energy management refers to technologies and processes that allows for measuring, monitoring and controlling of energy consumption of individual devices in residential homes. As recognized by present principles, both wide area and local communication networks such as WiFi, Bluetooth, and Power, Line Communication (PLC) can be used to connect the devices within the home and to send data to a display device. As further understood herein, it is desirable to provide effective control, displays, and support as to suggestions for energy savings on a consumer electronics (CE) device the user may conveniently operate, within the home to effect energy conservation.

SUMMARY OF THE INVENTION

Present principles permit a user or customer to control individual energy-using devices in the home, for example change the temperature setting of an air conditioner unit, or turn on or off other devices. To avoid the repeating manual operation, such control can be automated locally or externally. In the latter case, a gateway can connect the home network to a service provider who controls devices in the home remotely, depending on the agreement with the customer.

Accordingly, a consumer electronics (CE) device has a processor, in some embodiments a video display controlled by the processor, and a computer readable storage medium accessible to the processor and bearing instructions executable by the processor to cause the processor to present on the display a user interface (UI). The UI includes plural windows at least some of which represent a respective room in a residence and each presenting a respective visual indication indicating a relative consumption of energy use in the respective room. The CE device enables, a user of the CE device to "drill down" into a room to discover what appliances in that room are consuming energy.

In some implementations the indicator can be a finable bar that is filled according to energy use, with a lower fill indicating lower energy use and a higher fill indicating higher energy use. If desired, the processor can cause a message to be presented in each window indicating whether energy use is low, moderate, or high. At least one window may represent energy usage of a neighbor house as reported by a neighbor processor.

In example embodiments the UI presents an energy indication for the entire residence to indicate whether total energy consumption in the residence is low, medium, or high. Also, if desired the UI may present one or more historical energy consumption indicators, so that a user of the CE device can visualize current use against historical usage. The CE device can be established by a digital clock, a TV, a wireless telephone, and the like.

In another aspect, a consumer electronics (CE) device has a processor, a video display controlled by the processor, and a computer readable storage medium accessible to the processor and bearing instructions executable by the processor to cause the processor to present on the display a user interface (UI) enabling a user of the CE device to select energy savings rules to be automatically applied in a dwelling responsive to predetermined conditions within the dwelling.

In another aspect, a consumer electronics (CE) device employs user interfaces (UI) to allow a user to define energy management rules within the user's premises, visualize energy use in the home and in neighbor's homes for comparison and competition in saving energy, and receive tailored advertisements for appliances that are more energy efficient than what the user currently owns.

The details of the present invention, both as to its structure and operation, can best be understood in reference to the accompanying drawings, in which like numerals refer to like parts and in which:

BRIEF DESCRIPTION OF THE DRAWINGS

FIGS. 2 and 3 are screen shots of example user interfaces in accordance with present principles.

DETAILED DESCRIPTION OF THE PREFERRED EMBODIMENT

Figure 1:
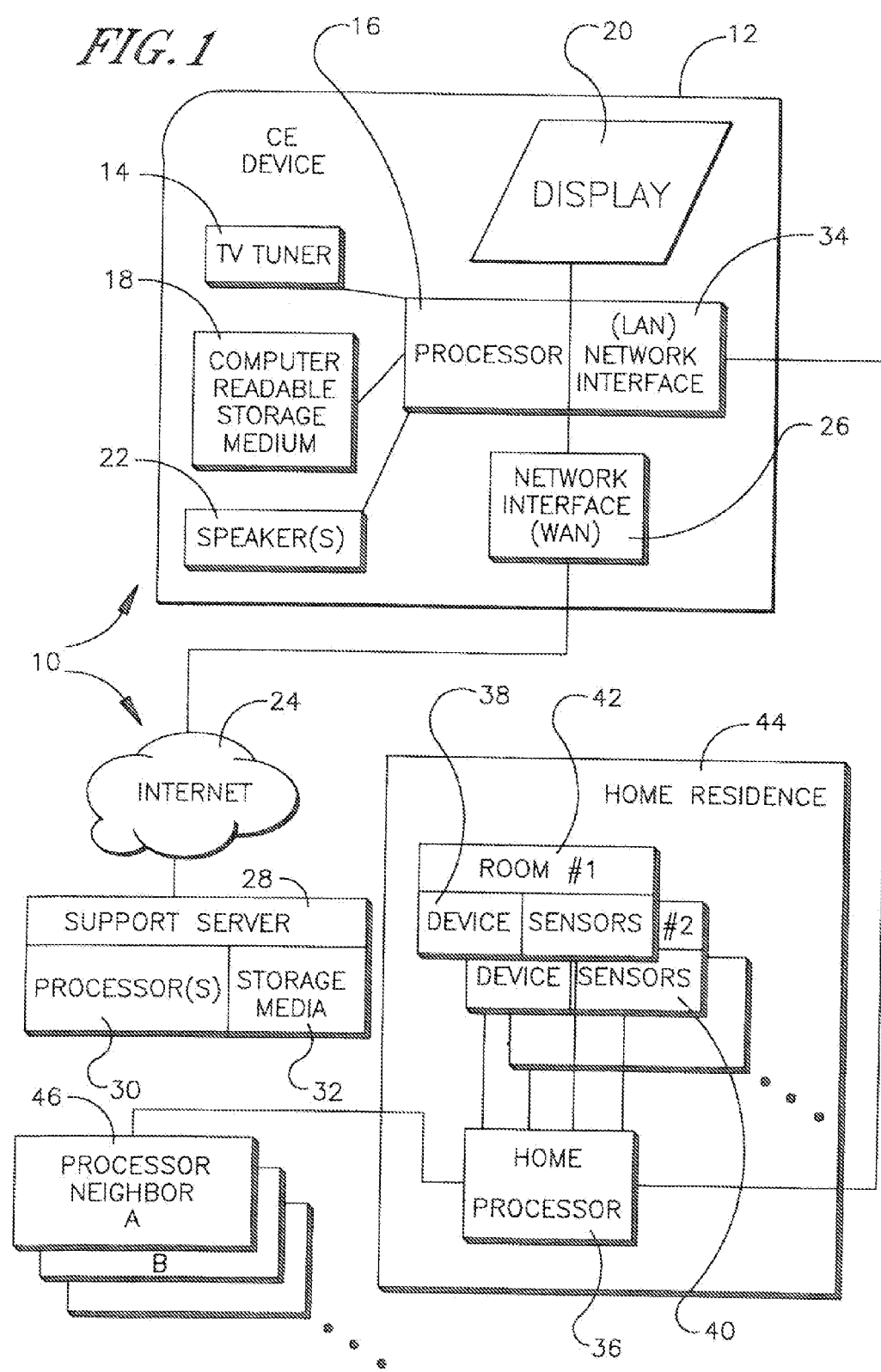
FIG. 1 is a block diagram of an example system in accordance with present principles.

Referring initially to FIG. 1, a system is shown, generally designated 10, which includes a consumer electronics (CE) device 12 such as a television, a wireless telephone, a personal digital assistant (PDA), a digital clock, etc. When embodied as a TV the CE device 12 typically includes a TV tuner 14.

The CE device 12 includes a processor 16 accessing a computer readable storage medium 18 such as but not limited to disk-based or solid state storage and bearing instructions executable by the processor 16 to undertake logic herein, including presenting the below-described user interfaces (UI) on a video display 20 and to output audio on one or more speakers 22. The video display may not be included on some devices such as routers but may be connected, to the device processor for presentation of the below-described UIs. As also shown in FIG. 1, the processor 16 may communicate with the Internet 24 using a wide area network (WAN) interface 26 such as but not limited to a wired or wireless modem, including a WiFi modem, a wireless telephony transceiver such as but not limited to a global system for mobile communications (GSM) transceiver or code division multiple access (CDMA) transceiver or variants thereof, etc. Through the Internet, the CE device 12 can access one or more support servers 28 having one or more processors 30 accessing various computer readable storage media 32 for implementing relevant portions of the logic below.

Furthermore, the CE device 12 may include a local area network (LAN) interface 34 such as but not limited a power line communication (PLC) interface or Bluetooth interface or Other wired or wireless interface such as an Ethernet interface. Using the LAN interface 34 and/or the WAN interface 26, the processor 16 of the CE device 12 may communicate with a home processor or controller or server 36 (referred to herein for convenience as "home processor") that in turn can communicate with various appliances 38 and sensors 40 located in rooms 42 of a home residence 44 with, which the user of the CE device 12 is associated. Indeed, the CE device 12 may in some embodiments be located within the home residence 44 and may be used to implement the home processor 36. Without limitation, the appliances 38 may be associated with respective controllers that can be controlled by the home processor 36 and/or CE device processor 16 and may be implemented by, e.g., lighting systems, refrigerators, heaters, TVs and other audio video devices, pool pumps, pool heaters, ovens, stoves, etc. The sensors 40 may be implemented by energy sensors such as but not limited power sensors or ammeters, and by ambient light level sensors, temperature sensors, motion sensors, and the like. The home processor 36 and/or CE device 12 (directly or through the home processor 36) may communicate with home processors 46 in neighboring dwellings for purposes to be shortly disclosed.

FIGS. 2 and 3 illustrate respective UIs that the processor 16 may present on the display 20 according to logic accessed on the medium 22 and signals received from the various components shown in FIG. 1. In FIG. 2, the UI presents windows 50, each representing a respective room 42 in the residence 44 and each bearing a label 52 with the room name, if desired. A visual indication 54 can also be presented in each window to indicate a relative consumption of energy use in that room. In the example shown, the indication 54 is a vertical bar that is filled according to energy use, with a lower fill indicating lower energy use and a higher fill indicating higher energy use. A message 56 may also be presented in each window 50 indicating whether energy use is low, moderate, or high.

Also, one or more of the windows 50 may represent the energy usage of a neighbor house as reported by a neighbor processor 46 over the WAN interface 26 or LAN interface 34. In this case, the accompanying indication 54 indicates that the neighbor is using very little energy; a textual message is keyed to the neighbor's use relative to the energy consumption in the residence 44 to exhort the user of the CE device 16 appropriately. When the neighbor is using less energy than the residence 44 as shown in the example, the message can be "catch up". On the other hand, if the neighbor is using the same a moderate amount of energy the message may be "you are neck and neck" or words to that effect, whereas if the residence 44 is using significantly less energy than the neighbor the message might be encouraging, such as "you are winning".

As shown at 58 a user of the CE device 12 can "drill down" into a particular room (in the example shown, the pool room) to discover what appliances in that room are consuming energy. The drill-down may be effected by means of a point-and-click device such as a TV remote commander or by configuring the display 20 as a touch screen display and enabling a user, by means of a tactile gesture on the screen, to expand the information display for a particular room. In the example shown, the drill down indicates that 30% of the energy consumption in the pool room is due to the pool heater while 70% is due to the pool pump.

Furthermore, an energy indication 70 for the entire residence 44 can be presented to indicate whether total energy consumption in the home is low, Medium, or high. In the example shown, because the indication is completely filled in the consumption is high, at a peak. The indication 70 may be accompanied by a label 72 as shown indicating that the current consumption of the residence 44 is being illustrated. Historical peak consumption and historical average consumption indicators 74, 76 with accompanying textual labels for the residence 44 may be juxtaposed with the current home consumption indicator 70 as shown, so that a user of the CE device 12 can visualize current use against average and peak historical usages. The CE device 12 may integrate energy consumption over time and dynamically refine the peak and historical indicators accordingly.

Additionally, a blackout indicator 78 may be presented on the UI in FIG. 2. The blackout indicator 78 may indicate whether a blackout is imminent so that a user of the CE device 12 can take appropriate measures if a blackout is indeed near. The processor 16 may receive information from a support server 28 indicating that the electrical grid energy usage is high and that a blackout may be imminent to configure the blackout indicator 78 appropriately.

FIG. 3 shows a rules selection UI that may be presented on the display 20 to enable a user of the CE device 12 to select energy savings rules to be automatically applied responsive to certain conditions. As indicated a user can select an "all" selector to cause the processor 16 to implement all the rules on the list UI 80. Or, the user can individually select rules the user desires to be implemented. Among the example rules that the user can implement are to turn off the lights in unoccupied rooms as indicated by a motion sensor 40 in the room. Also, a user can select to turn off lights during daylight hours responsive to an ambient light sensor in the residence 44 indicating daylight. Furthermore, the user can select to turn off any TVs in unoccupied rooms as indicated by motion sensors in the rooms. Also, the user can select to turn off a pool pump based on one or more circumstances as shown, including at peak energy use times for the electric grid, which the processor can receive from, e.g., a support server 28, and/or to turn off the pool pump when energy usage in the residence 44 exceeds a threshold as indicated by one or more power meter sensors 40. Still again, a user may be permitted to type in his own rule as shown by the text entry line at the bottom of the UI 80.

In effecting the above rules, the CE device processor 16 may communicate with the home processor 36 to command controllers in the various appliances to be controlled subject to the selected rules to deenergize or energize as appropriate. In some implementations as intimated above, the CE device 16 may communicate directly with appliance controllers in the residence 44 to effect the selected energy savings rules.

Figure 4:
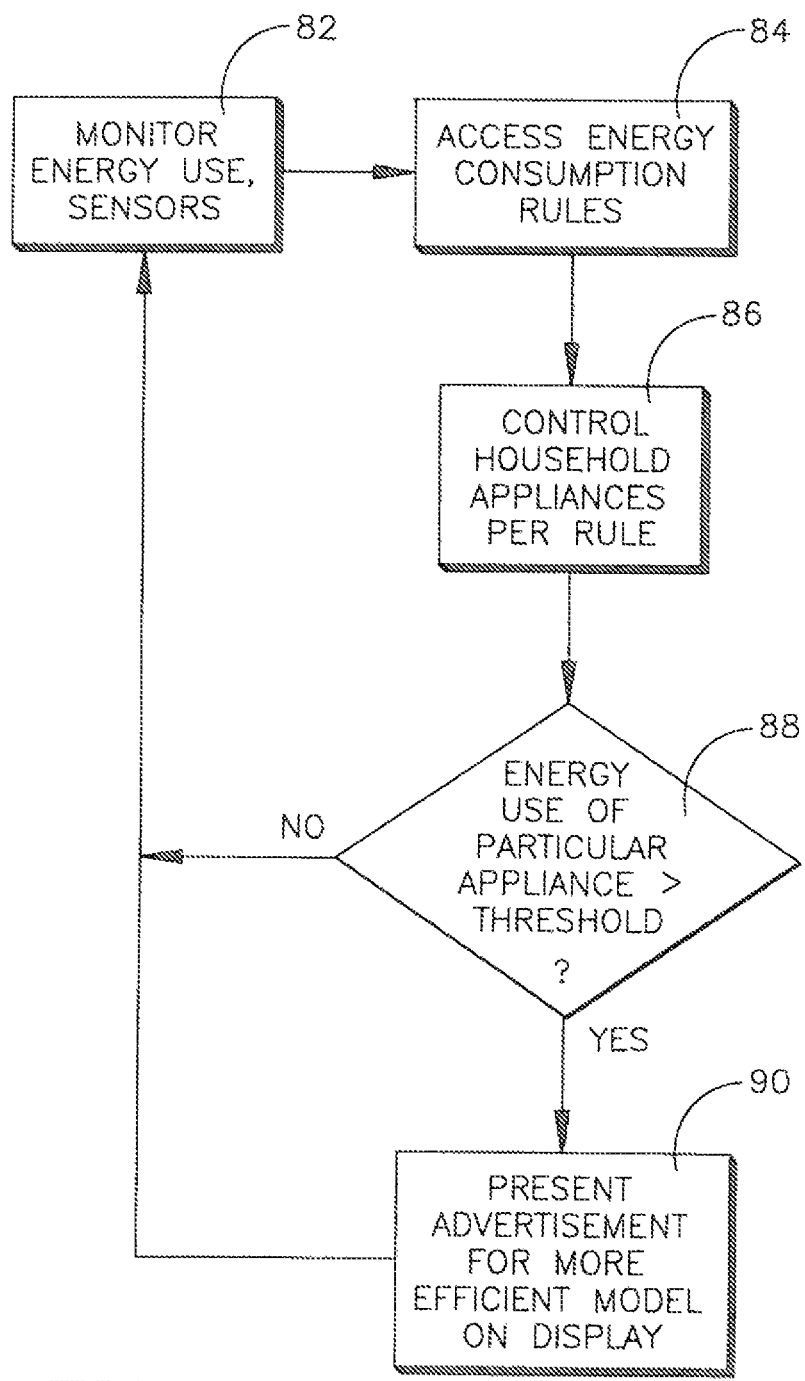
FIG. 4 is a flow chart of example logic in accordance with present principles.

Accordingly and now turning to FIG. 4, at block 82 the processor 16 monitors energy use in the residence 44 by monitoring the various sensors 40, some of which, recall, may be implemented by power meters. The energy consumption rules are accessed at block 84 and household appliances controlled in accordance therewith at block 86.

If desired, in some implementations the logic may periodically flow to decision diamond 88 to determine whether any particular appliance 38 as indicated by an associated sensor 40 that is a power meter consumes more than a threshold amount of energy. Typically, the thresholds will vary from appliance to appliance since refrigerators, for example, inherently consume more power than digital clocks. If an appliance exceeds its energy threshold, the logic may flow to block 90 to present an advertisement on the display 20 extolling, a newer, more energy-efficient replacement appliance. To this end, the processor 16 may access a support server 28 to obtain one or more advertisements. The processor 16 may affirmatively "pull" ads from the server 28 responsive to a positive determination at decision diamond 88 or the server 28 may periodically push ads to the processor 16, which stores them in the medium 18 until such time as a positive determination is made at decision diamond 88, triggering the processor 16 to present the appropriate ad on the display 20.

It may now be appreciated that a user can see viewer-selected neighbor energy consumption on a UI such as that shown in FIG. 2. This can foster beneficial energy conservation competition and form the basis for the giving of neighborhood awards. Also, a UI such as that shown in FIG. 2 may be provided for real time visualization of energy use, room by room if desired, and the various text messages 56 and indicators 54 may be sized and shaped according to the amount of energy use, e.g., high consumption indicators 54 may be filled in with red with larger accompanying text whereas low consumption indicators may be filled in with green with smaller accompanying text. The visualization may be distributed by room, appliance class, and even the person using it, and as shown in FIG. 2 may illustrate peak vs. average consumption. Rules can be provided to determine whether an appliance should be occasionally (conditionally) energized or whether it may remain energized always as long as a person has initially turned it on. A drill down visualization hierarchy from house to room to appliance may be provided as described and the UIs described herein may provide a comparison of historical energy use with current (actual) usage. The visualization of FIG. 2 moreover provides indication of energy grid load situation to highlight special need for conservation. The user may be accorded a pre-warning when a blackout is imminent, hours or days in advance as circumstances permit.

The CE device 16 provides a service that monitors the house for certain things and make recommendation or automatic action depending on preset, e.g. turning off a TV when no person is detected in the room or turning off a pool pump or refrigerator if the TV is on and peak energy demand is approaching or any other of the rules described, above. As discussed, this may done based on detecting no motion or IR signature of a person and may also be done based on time of the day. The CE device 16 provides a learning system that predicts usage and takes appropriate action and if desired weather impact and energy grid load as received from the support server 28 may be taken into consideration. Automatic advertisements may be "pushed" or "pulled" from the device 16 for a low energy product to detecting an in-home appliance that uses more energy than average for that type of appliance. Discounts and/or energy rebates may be provided for newer energy efficiency products as incentives.

While the particular CE DEVICE FOR HOME ENERGY MANAGEMENT is herein shown and described in detail, it is to be understood that the subject matter which is encompassed by the present invention is limited only by the claims.

What is claimed is:

1. Consumer electronics (CE) device, comprising:
   at least one processor;
   at least one video display configured for being controlled by the processor; and
   at least one computer readable storage medium accessible to the processor and bearing instructions executable by the processor to cause the processor to present on the display a user interface (UI) including plural windows simultaneously with each other, at least some of which represent a respective room in a residence and each presenting a respective visual indication indicating a relative and/or absolute consumption of energy use in the respective room, the CE device enabling a user of the CE device to "drill down" into a room to discover what appliances in that room are consuming energy, wherein the indicator is a fillable bar that is filled according to energy use, with a lower fill indicating lower energy use and a higher fill indicating higher energy use, the bar being fillable in that a length of the bar is constant and an area of fill of the bar is variable wherein the instructions when executed by the processor cause the processor to cause an alpha-numeric message to be presented in each window indicating whether energy use is low, moderate, or high.

2. The CE device of claim 1, wherein at least one window represents energy usage of a neighbor house as reported by a neighbor processor.

3. The CE device of claim 1, wherein the UI presents an energy indication for the entire residence relative to previous energy indications.

4. The CE device of claim 1, wherein the UI presents at least one historical energy consumption indicator, so that a user of the CE device can visualize current use against historical usage.

5. The CE device of claim 1, wherein the CE device is established by a digital clock.

6. The CE device of claim 1, wherein the CE device is established by a TV.

7. The CE device of claim 1, wherein the CE device is established by a wireless telephone.

8. Consumer electronics (CE) device, comprising:
   at least one processor;
   at least one video display configured for being controlled by the processor; and
   at least one computer readable storage medium accessible to the processor and bearing instructions executable by the processor to cause the processor to present on the display a user interface (UI) enabling a user of the CE device to select energy savings rules to be automatically applied in a dwelling responsive to predetermined conditions within the dwelling, wherein the UI presents a fillable bar that is filled according to energy use, with a lower fill indicating lower energy use and a higher fill indicating higher energy use, the bar being fillable in that a length of the bar is constant and an area of fill of the bar is variable, wherein the instructions when executed by the processor cause the processor to cause an alpha-numeric message to be presented indicating whether energy use is low, moderate, or high.

9. The CE device of claim 8, wherein the UI enables a user to select individual rules on the list.

10. The CE device of claim 9, wherein a rule on the list is to automatically turn off lights in unoccupied rooms as indicated by a motion sensor in the room.

11. The CE device of claim 9, wherein a rule on the list is to automatically turn off lights during daylight hours responsive to an ambient light sensor indicating daylight.

12. The CE device of claim 9, wherein a rule on the list is to automatically turn off a TV in an unoccupied room as indicated by a motion sensor in the unoccupied room.

13. The CE device of claim 9, wherein a rule on the list is to automatically turn off a pool pump based on at least one predetermined condition.

14. A consumer electronics (CE) device including a processor, the CE device configured with instructions executable by the processor for employing user interfaces (UI) to allow a user to define energy management rules within the user's premises, visualize energy use in the home and in neighbor's homes for comparison and competition in saving energy, and receive tailored advertisements for appliances that are more energy efficient than what the user currently owns, wherein at least one of the UIs presents a fillable bar that is filled according to energy use, with a lower fill indicating lower energy use and a higher fill indicating higher energy use, the bar being fillable in that a length of the bar is constant and an area of fill of the bar is variable, wherein the CE device is configured to cause an alpha-numeric message to be presented indicating whether energy use is low, moderate, or high, the CE device being further configured for determining whether an appliance in the premises consumes more than a threshold amount of energy and responsive to a determination that the appliance consumes more than a threshold amount of energy, present on a display of the CE device an advertisement directed to a newer, more energy-efficient replacement appliance.

15. The CE device of claim 14, wherein a processor of the CE device controls a display of the CE device to present a UI including plural windows simultaneously with each other, at least some of which represent a respective room in the premises and each presenting a respective visual indication indicating a relative consumption of energy use in the respective room, the CE device enabling a user of the CE device to "drill down" into a room to discover what appliances in that room are consuming energy.

16. The CE device of claim 14, wherein a processor of the CE device controls a display of the CE device to present a UI enabling a user of the CE device to select energy savings rules to be automatically applied in a dwelling responsive to predetermined conditions within the dwelling.

* * * * *